United States Patent
Krokeide

(10) Patent No.: US 6,220,724 B1
(45) Date of Patent: Apr. 24, 2001

(54) DEVICE FOR REALIZING ACTIVELY LUMINOUS ILLUMINATED ROUTE SYSTEMS

(76) Inventor: Gunnar Krokeide, Bahnhofstrasse 4, D-22885 Barsbüttel (DE)

(*) Notice: Subject to any disclaimer, the term of this patent is extended or adjusted under 35 U.S.C. 154(b) by 0 days.

(21) Appl. No.: 09/423,183
(22) PCT Filed: Mar. 3, 1999
(86) PCT No.: PCT/EP99/01359
  § 371 Date: Nov. 3, 1999
  § 102(e) Date: Nov. 3, 1999
(87) PCT Pub. No.: WO99/45313
  PCT Pub. Date: Sep. 10, 1999

(30) Foreign Application Priority Data

Mar. 3, 1998 (DE) .......................................... 298 03 477 U

(51) Int. Cl.$^7$ ...................................................... F21V 1/00
(52) U.S. Cl. ........................... 362/240; 362/235; 362/800
(58) Field of Search .................................. 362/235, 240, 362/351, 545, 800

(56) References Cited

U.S. PATENT DOCUMENTS

| | | | |
|---|---|---|---|
| 5,050,047 | * 9/1991 | Viner et al. | 362/240 |
| 5,408,395 | * 4/1995 | Schim et al. | 362/240 |
| 5,499,170 | * 3/1996 | Gagne | 362/240 |
| 5,882,105 | * 3/1999 | Barlow | 362/240 |
| 6,074,074 | * 6/2000 | Marcus | 362/240 |

* cited by examiner

Primary Examiner—Sandra O'Shea
Assistant Examiner—Peggy A Neils
(74) Attorney, Agent, or Firm—Pendorf & Cutliff

(57) ABSTRACT

The invention relates to a device for realizing actively luminous illuminated route systems. According to the invention, cables and luminescent diodes (19) are arranged in a receiving profile (3) and are covered by a cover strip (20). A film (21) which is metallized on one side is arranged on the cover strip (20). The light of the luminescent diodes (19) shines through one side of the film when the actively luminous illuminated route system is activated.

2 Claims, 1 Drawing Sheet

DEVICE FOR REALIZING ACTIVELY LUMINOUS ILLUMINATED ROUTE SYSTEMS

BACKGROUND OF THE INVENTION

1. Field of the Invention

The invention concerns a device for realizing actively luminous illuminated route or track systems using a receptacle profile which is generally U-shaped in cross-section, comprising a base and shanks along the longitudinal edges, with a clamping arrangement integrated in the side retaining shanks for securing a cover strip of an actively luminous illuminated route system, and with a recess for receiving cables and light diodes for realizing the active luminous illuminated route system.

2. Description of the Related Art

A device of this type is known in general from WO 97/12646 (incorporated herein by reference) and is designed primarily for employment in buildings and ships. In this device, a generally U-shaped receiving profile is employed, in which retaining shanks of various breadths are provided along the edge strip of the base plate. On the short retaining shanks, a notch is formed open towards the other retaining shank. The other broad retaining shank exhibits a crosspiece spaced from the outer edge of the shank, perpendicular to the plane of the retaining shank, and directed towards the notch, and further, on the free end section, a projection extending over the length of the receiving profile. A strip can be inserted in the notch and thereby retained between the crosspiece and the projection. The strip can be comprised of a phosphorescent material or can be a cover-plate for an actively luminous illuminated route system. The recess situated behind this strip serves for receiving cables and light diodes of an actively luminous illuminated route system. In this device it has however been found that a problem-free guidance of the light diodes and actively luminous illuminated route system is only achieved with difficulty, so that the light yield is compromised.

Besides this, this type of device has, when employed in buildings and ships, an optical appearance which clashes with the internal architecture.

SUAMMRY OF THE INVENTION

The task of the invention is comprised therein, of improving the device of the above-described type in such a manner, that upon activation the light yield is improved, and during nonactivation, a better optical integration in the spatial environment results.

In an advantageous embodiment of the invention, each light diode is provided with a lens, which is provided in the cover strip of the actively luminous illuminated route system.

BRIEF DESCRIPTION OF THE DRAWINGS

The invention is described in the following in greater detail by reference to the illustrative embodiment shown in schematic manner in the drawing. There is shown.

DETAILED DESCRIPTION OF THE INVENTION

Figure 1:
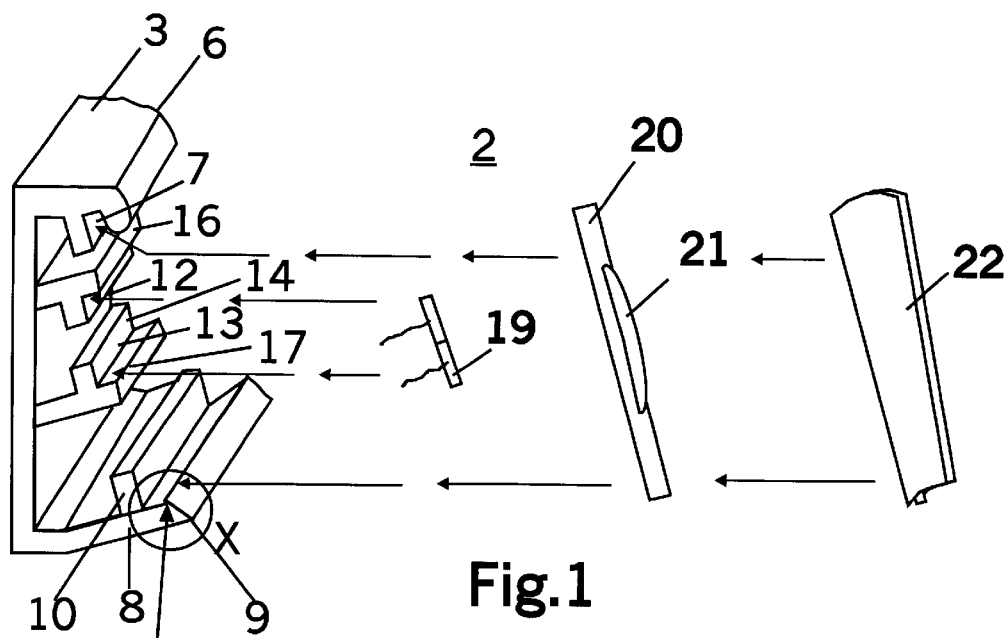
FIGS. 1 & 2 A device for an actively luminous illuminated route system in a perspective view in an exploded representation and in an assembled representation.
Figure 1:
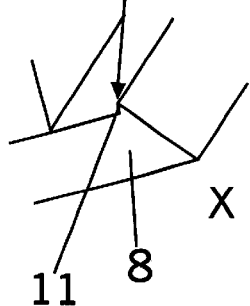
Figure 2:
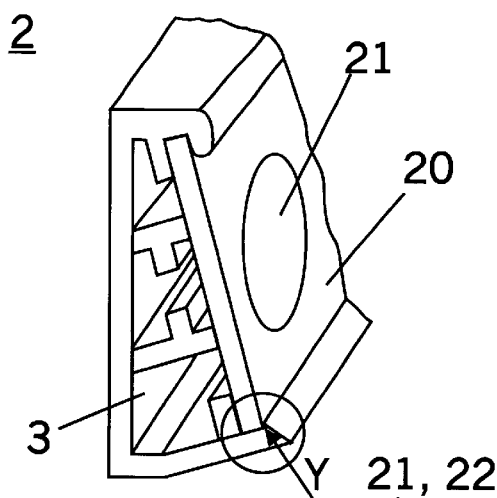
Figure 2:
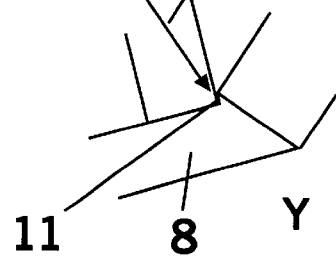

The receiving profile 3 of the device 2 includes a base plate, on the edge sections of which are respectively provided a holding shank 6,8. In the first holding shank 6 with smaller breadth a notch 7 is provided on the end section and directed towards the second holding shank 8. The outer end section of the second holding shank 8 is angled towards the first holding shank 6 and exhibits a crosspiece 10, which is directed towards notch 7. The crosspiece 10 is provided spaced apart from the outer edge 9 of the second holding shank 8. On the outer edge 9, there is a ridge or projection 11 which likewise is directed towards the notch 7. A cover strip 20 of the actively luminous illuminated route system can, after it has been inserted in notch 7, be clamped between crosspiece 10 and projection 11 via a clip type connection. This is shown in greater detail in the enlarged sections "X" and "Y". Two stems are formed on the base plate between the holding shanks 6,8, which extend parallel to each other, spaced apart from each other, and oriented parallel to the outer end section of the retaining or holding shank 8. The stems 16,17 form a recess 12, in which a step or shoulder 13 is formed. The shoulder 13 is formed by two further arms projecting from the stems 16,17. The shoulder 13 serves for receiving a carrier strip for cables and light diodes 19 of the actively luminous illuminated route system. As a result of the recess 13, the height and breadth in which the carrier strip is fixed is clearly and well-defined. The cover strip 20 includes lenses 21, which respectively are associated with a light diode 19. Thereby the light yield of the light diode 19 can be increased. A half-mirrored or reflective foil 23 is provided on the outer surface of the cover strip. The half-mirrored surface can be produced by vapor depositing. Upon activation of the device 2, light from the light diode 19 penetrates through the foil 22 and therewith characterizes the illuminated route system. Upon de-activation, the foils 22 reflect the wall covering, so that the device 2 optically integrates in the wall.

It is also possible to employ cover strips 20 without lenses 21 in the device 2, wherein however also in this case the cover strip 20 is covered by means of the half-mirrored or reflective foil 22.

What is claimed is:

1. A device for forming an actively luminous illuminated route systems
   a carrier strip including cables and light diodes for forming an actively luminous illuminated route system,
   a cover strip forming a cover of an actively luminous illuminated route system,
   a receptacle profile having a generally U-shaped cross section comprising an elongate base having first and second edges, a first shank 6 extending along said first base edge and a second shank 8 extending along said second base edge, wherein said first and second shanks include profiles forming a clamping device for holding said cover strip, said receptacle profile further including a recess adapted for receiving said carrier strip, wherein
   two stems (16,17) are provided between said two shanks (6,8) of the receiving profile (3) spaced apart parallel to each other and parallel to the outer end sections of said second shank (8), which two stems (16,17) together form a recess (12), wherein on each stem (16,17) respectively one shoulder (13) is formed, which shoulders are adapted for receiving a carrier strip for cables and light diodes (19) of an actively luminous illuminated route system, wherein the cover strip (20) covering the light diodes (19) is securely clamped in a notch (7) formed on the first holding shank (6) and between a cross-piece (10) and a projection (11) formed on the second shank (8), and wherein a one-way reflective foil (20) is provided on the cover strip (20), through which the light of the light diodes (19) shine through upon activation of the actively luminous illuminated route system.

2. Device according to claim 1, thereby characterized, that each respective light diode (19) is associated with a lens (21), which is provided in the cover strip (20) of the actively luminous illuminated route system.

\* \* \* \* \*